(12) United States Patent
Fuller et al.

(10) Patent No.: US 7,024,434 B2
(45) Date of Patent: Apr. 4, 2006

(54) METHOD AND SYSTEM FOR MODIFYING SCHEMA DEFINITIONS

(75) Inventors: Billy J. Fuller, Woodinville, WA (US); Donald J. Hacherl, North Bend, WA (US)

(73) Assignee: Microsoft Corporation, Redmond, VA (US)

( * ) Notice: Subject to any disclaimer, the term of this patent is extended or adjusted under 35 U.S.C. 154(b) by 488 days.

(21) Appl. No.: 10/286,008

(22) Filed: Nov. 1, 2002

(65) Prior Publication Data

US 2004/0088321 A1   May 6, 2004

(51) Int. Cl.
*G06F 17/30* (2006.01)
(52) U.S. Cl. ................................. 707/203; 707/101
(58) Field of Classification Search .............. 707/1–10, 707/100–104.1, 200–203; 717/170
See application file for complete search history.

(56) References Cited

U.S. PATENT DOCUMENTS

| | | | | |
|---|---|---|---|---|
| 5,678,038 A | 10/1997 | Dockter et al. | ................ | 707/1 |
| 5,737,597 A | 4/1998 | Blackman et al. | .......... | 707/102 |
| 5,737,598 A | 4/1998 | Blackman et al. | .......... | 707/102 |
| 5,765,162 A | 6/1998 | Blackman et al. | ...... | 707/103 R |
| 5,878,411 A | 3/1999 | Burroughs et al. | ............ | 707/4 |
| 5,983,235 A | 11/1999 | Blackman et al. | ...... | 707/103 R |
| 6,076,090 A | 6/2000 | Burroughs et al. | .......... | 707/102 |
| 6,216,136 B1 * | 4/2001 | Ronstrom | ................... | 707/203 |
| 6,223,184 B1 | 4/2001 | Blackman et al. | ...... | 707/103 R |
| 6,389,589 B1 | 5/2002 | Mishra et al. | ............. | 717/170 |
| 6,460,052 B1 * | 10/2002 | Thomas et al. | ............. | 707/203 |
| 6,708,187 B1 * | 3/2004 | Shanumgam et al. | ....... | 707/201 |

* cited by examiner

*Primary Examiner*—Jeffrey Gaffin
*Assistant Examiner*—Yicun Wu
(74) *Attorney, Agent, or Firm*—Workman Nydegger (57) ABSTRACT

A new schema implementation enables reversible changes to be made to definitions in a schema. The definitions of attributes and classes are in the form of schema objects. Each schema object has an internal ID in addition to its unique name and object ID (OID), and a deactivation flag for indicating whether the schema object has been deactivated. To modify an attribute or class, the corresponding schema object is deactivated by setting its deactivation flag to "TRUE," and a new schema object is created to contain the changes. The new schema object has the same unique name and OID as the old schema object but is given a different internal ID. When a client wants to access instances of the schema object by its unique name or OID, a translation is made to provide the internal ID of the new schema object such that instances of the new schema object are located instead of the old schema object. The changes to the schema can be reversed by reactivating the first schema object and deactivating the second schema object.

26 Claims, 6 Drawing Sheets

METHOD AND SYSTEM FOR MODIFYING SCHEMA DEFINITIONS

TECHNICAL FIELD

This invention relates generally to the storage and access of data in a computer database, and more particularly to a way to handle changes to definitions of data objects and attributes in a schema.

BACKGROUND OF THE INVENTION

A schema is a description that defines in a formal language the structure of data stored in a computer database system. In other words, a schema tells a database service how the data in an associated database should be read. One common use of schemas is to describe the contents of a directory database for a network, such as the Internet. The directory database contains a plurality of data instances that represent various entities, such as persons, groups, computers, resources such as printers, etc. In a computer network that is divided into domains, each domain controller hosts a directory system agent that maintains a local directory database, and a schema for the entire directory database system and data objects created according to the schema are replicated to all the directory services in the system.

Since a schema provides the key to understanding the meanings of data stored in the database constructed according to the schema, it is imperative to ensure that all the definitions of the data attributes in the schema are accurate. If a schema definition of a data object or attribute is incorrect, all the affected data objects become useless. The magnitude of the error is multiplied when the schema and the data objects are replicated to multiple servers. It is, however, very difficult to get all the definitions in schema right at the first time. Some initial definitions of objects and their attributes may simply be wrong for their intended use. Moreover, corrections made to the schema now may conflict with future changes. Thus, users of a schema-based database often feel the need to make changes to the schema definitions. In addition, a user may want to try changing a definition and, if that change does not work, to be able to easily revert to the original definition.

In some applications, however, it has been very difficult for users to change schema definitions. For instance, in one existing directory service application, to protect the integrity of the directory schema, any addition to the schema is irreversible. Once an attribute or class of data objects is added to the schema, the user cannot remove and replace its definition while keeping its identity intact if an error was made in setting an immutable property of the schema object, such as the syntax of an attribute or the relative distinct name (RDN) of the class. Even though that existing application offers support for the notion of "defunct" attributes and classes, the values of identifier attributes of defunct schema attributes and classes could not be reused by newly added schema objects. For the directory service administrators, the inability to make changes is highly undesirable. They are not comfortable with the notion of not being able to back out of an unwanted directory schema addition.

Thus, what is needed is a way to allow changes to be easily made to schema definitions without compromising the integrity of the schema and its associated data instances or introducing conflicts and to allow the changes to be reversed easily if necessary.

SUMMARY OF THE INVENTION

In view of the foregoing, the present invention provides a way to enable reversible changes to be made to definitions in a schema for a database. In accordance with the invention, an incorrect or undesirable attribute can be deactivated and superceded with a new, corrected attribute. To that end, each schema object has an internal ID in addition to a primary identifier, such as its unique name and object ID (OID). In addition, each schema object includes a deactivation flag attribute. When a user wants to modify a schema object, the deactivation flag of that schema object is set to a value, such as "TRUE", to indicate that the schema object is deactivated, and a new schema object is created to contain the changes. The new schema object uses the same primary identifier as the old schema object but is given a different internal ID. When a client wants to access instances of a schema object by its unique name or OID, a translation is made to provide the internal ID of the new schema object such that the new schema object is located instead of the old schema object. The old schema object can be reactivated by changing its deactivation flag to indicate that it is active, and changing the newer schema object's deactivation attributed to deactivate it.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
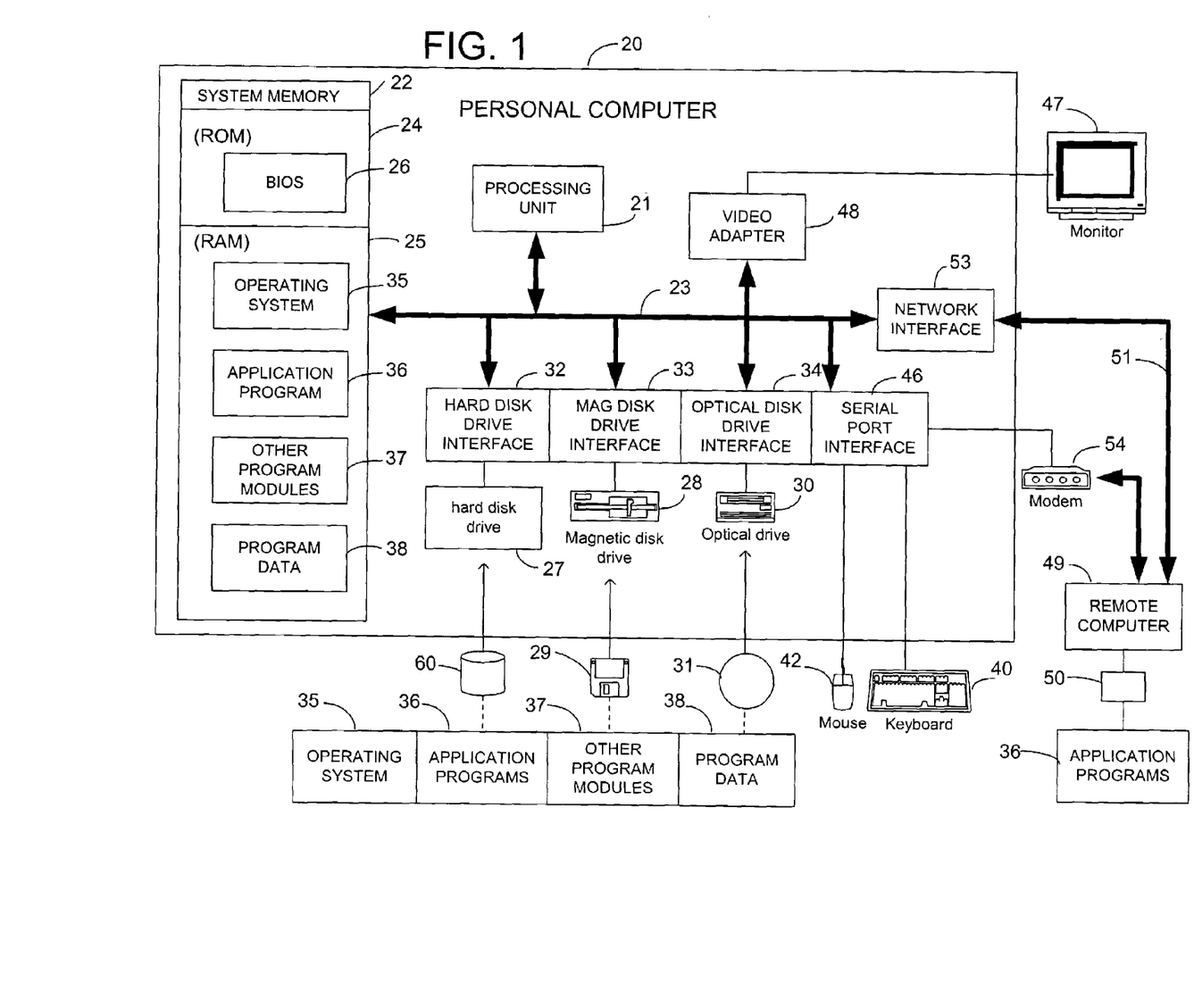
FIG. 1 is a block diagram generally illustrating an exemplary computer system on which a schema-based database server in accordance with the present invention may be implemented.

The following description begins with a description of a general-purpose computing device that may be used for implementing the schema modification in accordance with the invention, and the invention will be described in greater detail with reference to FIGS. 2–6. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention is directed to a way to enable modification of definitions of data objects and attributes in a schema. In accordance with the invention, the schema can be modified by deactivating an undesired attribute or class and replacing it with a new attribute or class that has the same primary identifier as the deactivated one. Even though the invention will be described below in the context of a schema for distributed directory service, it will be appreciated that the schema modification in accordance with the invention can be used in different schema-based database applications.

Figure 2:
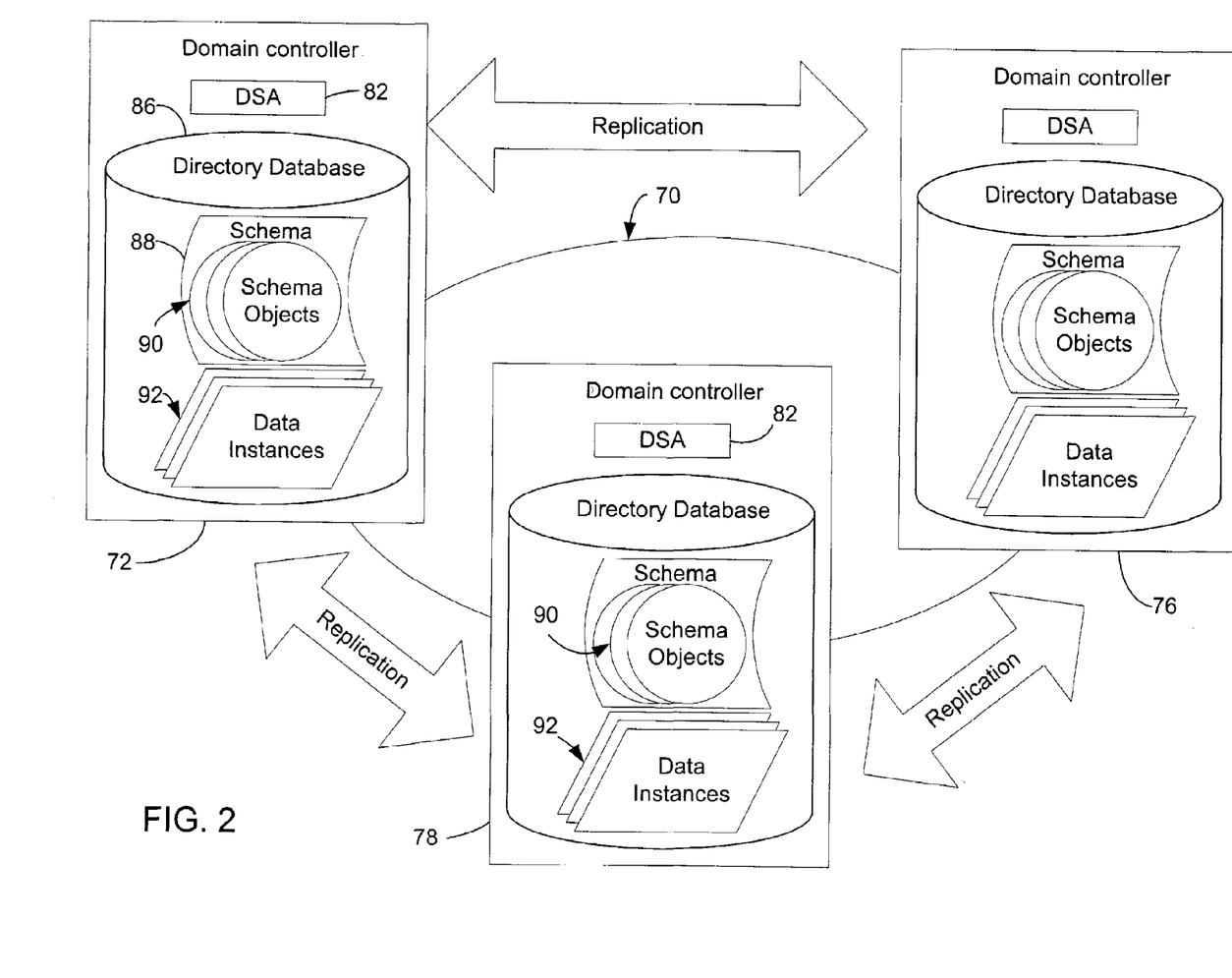
FIG. 2 is a schematic diagram showing an exemplary environment in which schema objects and their data instances for a directory service are replicated among domain controllers.

Referring to FIG. 2, in a preferred embodiment, the invention enables changes to be made to a schema that is used in a directory service system of a network 70. The network includes a plurality of domain controllers. For simplicity of illustration, only three domain controllers 72, 76, 78 are shown. Each of the domain controllers hosts a directory system agent (DSA) 82, which maintains a local directory database 86. The DSAs and directory databases of the different domain controllers form a distributed directory service system in which directory data are replicated among the directory services. The directory databases are managed in accordance with the OSI X.500 protocol and are accessed via the Lightweight Directory Access Protocol (LDAP).

To ensure that the directory data are stored, searched, and interpreted in the same way across the domains, the directory service system uses a schema 88 that contains formal definitions of data object classes and attributes of the data objects stored in the directory database. As shown in FIG. 2, the schema 88 in each directory database includes a plurality of schema objects 90, as will be described in greater detail below. The database further includes a plurality of data instances 92. Each data instance contains data describing a network entity, such as a user, a file, a printer, a computer, etc. The schema objects 90 and data instances 92 are replicated among the domain controllers. Thus, a change made to a schema object or data instance will propagate over the entire network.

Figure 3:
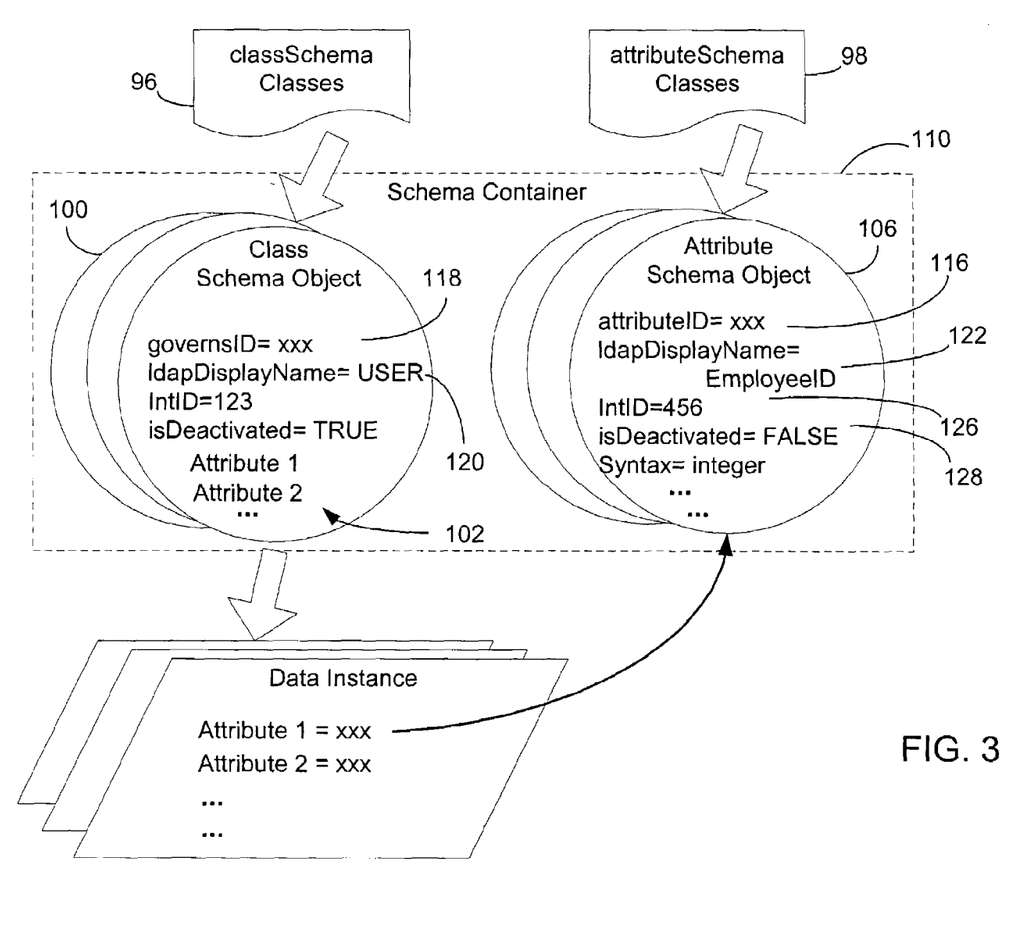
FIG. 3 is schematic diagram showing two types of schema objects used in a preferred embodiment of the invention.

Turning now to FIG. 3, the definitions of network entity classes and their attributes are stored in the directory as instances of classSchema classes 96 and attributeSchema classes 98, respectively. Each class schema object 100, which is an instance of a classSchema class, contains the definition of a class of network entities, which may be users, printers, or application programs, etc., that share a set of common characteristics. The definition of each network entity class contains a list of attributes 102 that can be used to describe an instance of the class. For example, the USER class has attributes such as "givenName," "surname," and "streetAddress." The definitions of the attributes are not provided in the class schema object but rather in separate attribute schema objects. Each attribute schema object 106 is an instance of an attributeSchema class. The definition for each attribute includes the unique identifiers for the attribute, the syntax for the attribute (i.e., the data type for the attribute's value), optional range limits for the attribute values, etc. The directory schema defines each attribute only once, i.e., there is a single attribute schema object for that attribute. The attribute and class schema objects (i.e., instances of the attributeSchema and classSchema classes) are stored in a well-known place in the directory called the schema container 110.

To distinguish the attribute and class schema objects from one another, each of the schema objects has one or more identifier attributes for use by clients of the directory system to identify the object. For purposes of this invention, such identifying attributes used by external clients are referred to as the "primary identifier." In the preferred embodiment, each schema object includes an object identifier (OID) and a user-friendly name, and either the OID or the user-friendly name, or both, may be considered as primary identifier. OIDs are unique values issued by various "Issuing Authorities" to uniquely identify data elements, syntax, and various other parts of distributed applications where uniqueness is important. The OID of an attribute is given by the value of the "attributeID" property 116 of the corresponding attribute schema object 106. The OID of a class, on the other hand, is given by the value of the "governsID" property 118 of the corresponding class schema object 100.

Each class or attribute also has a user-friendly name that is given by the value of the "ldapDisplayName" property 120, 122 of the corresponding class schema object or attribute schema object. The user-friendly name serves as an identifier used in Lightweight Data Access Protocol (LDAP) operations. For example, an object of the class "USER" may have an attribute that has a ldapDisplayName of "EmployeeID," whose AttributeID is 1.2.840.11356.1.2.610 and whose value is EMP#123456. Applications may access the attributes of a data instance by referencing the attributes by their AttributeID values. Applications may also, and more commonly, use the user-friendly name of the AttributeID, in their requests to access an attribute.

In a conventional schema implementation that preceded the present invention, each OID or user-friendly name uniquely identifies a schema object. In other words, there can be only one schema object in the entire schema container that corresponds to the OID or the user-friendly name. The conventional implementation also restricts modifications to certain properties on the attribute schema and class schema objects, making them immutable as well. This immutable association between the identity of an attribute/class and some of its properties in its definition is at the core of the difficulties in modifying the schema of the conventional implementation.

The present invention solved this problem by doing away with such immutable association. In accordance with the invention, there can be multiple schema objects that have the same primary identifier but different syntax or other properties. It should be noted that the term "properties" is used herein as synonymous to "attributes." To distinguish schema objects that have the same primary identifier, each schema object in the directory database is given another identifier referred to hereinafter as the "internal ID" or "IntID." The internal ID 126 is "internal" in the sense that it is internal to the directory service and not used by external applications to refer to the corresponding attribute or class. In a preferred embodiment, the internal ID is assigned a random value in the range of 0x80000000 to 0xBFFFFFFF. Each of the schema objects may also include an isDeactivated attribute 128, which will be described in greater detail below.

Figure 4:
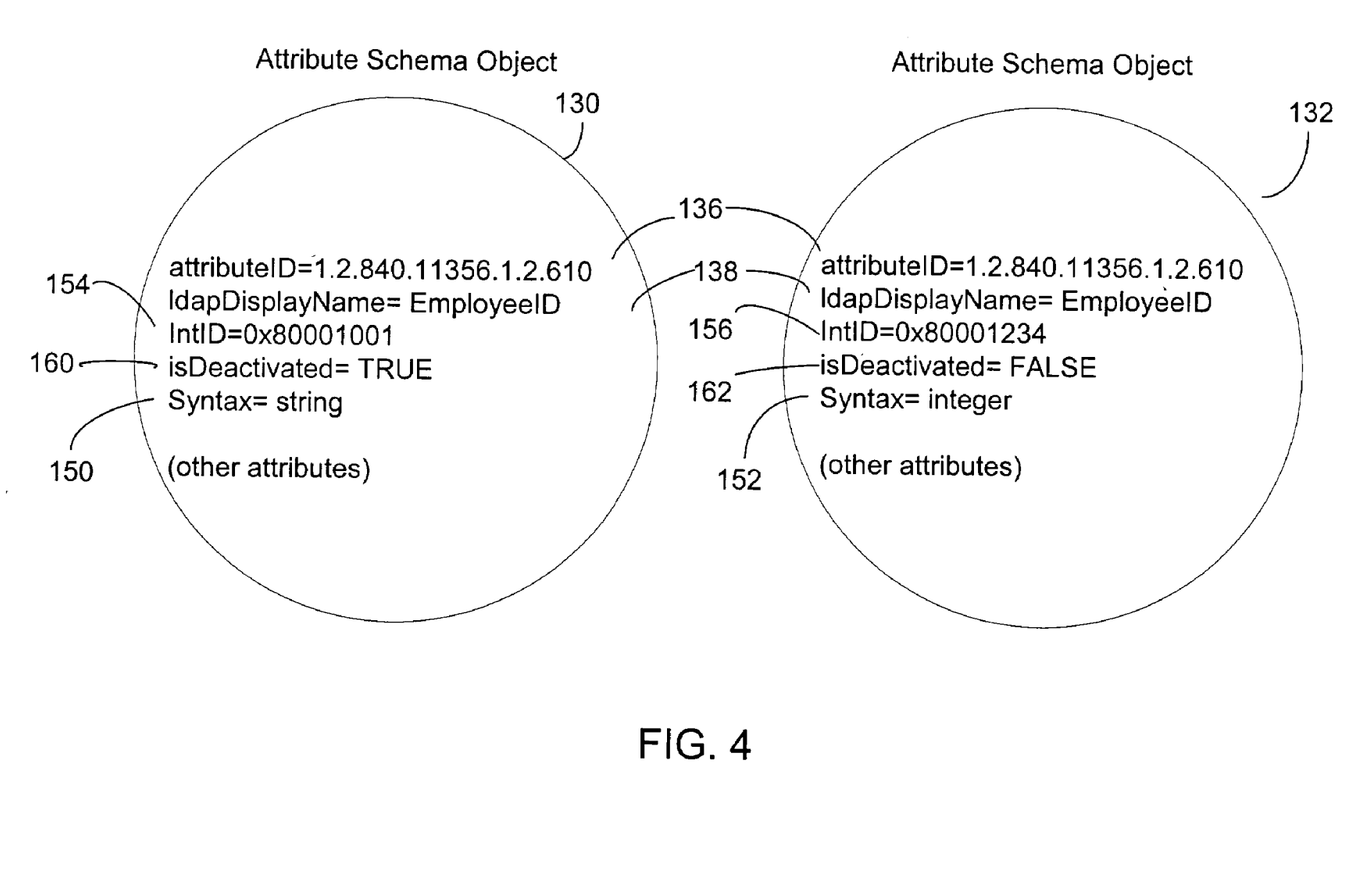
FIG. 4 is a schematic diagram showing an attribute schema object that has been deactivated and another attribute schema object for replacing the deactivated attributed schematic object.

By way of example, as shown in FIG. 4, two attribute schema objects 130, 132 may have the same values for the attributeID 136 and ldapDisplayName 138, but different syntax descriptions. Specifically, the syntax 150 for the attribute schema object 130 is "string", while the syntax 152 for the other attribute schema object 132 is "integer". The two attribute schema objects are distinguished by their IntIDs, 154, 156, which have different values.

In accordance with an aspect of the invention, each schema object also has an attribute called "isDeactivated". This attribute is used as a flag to indicate whether the schema object is "deactivated" or not. For example, as illustrated in FIG. 4, the attribute schema object 130 is deactivated because the value of its isDeactivated attribute 160 is set to "TRUE," while the other attribute schema object 132 is active as indicated by the value of its isDeactivated attribute 162, which is set to "FALSE."

Figure 5:
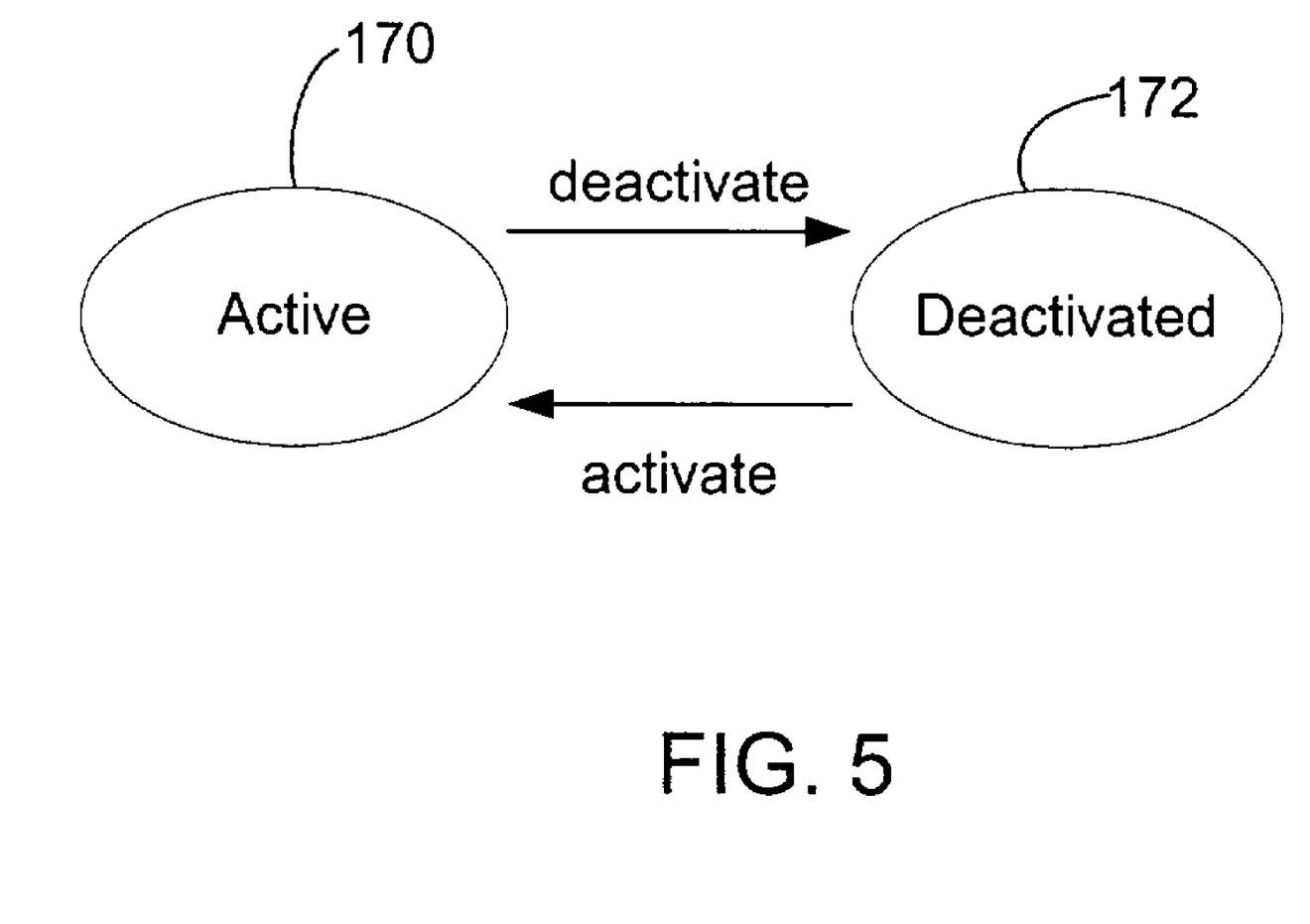
FIG. 5 is a schematic diagram showing different operational states of a schema object.

The combination of the IntID and isDeactivated attributes allows schema objects to be easily deactivated and replaced by new schema objects, and a deactivated schema object (and its data instances) can be resurrected easily by reactivating it and deactivating the schema object that shares the same primary identifier with it. As shown in FIG. 5, a schema object in an active state 170 is changed to a deactivated state 172 when it is deactivated by setting its isDeactivated value to "TRUE," and a deactivated schema object is returned to the active state when it is reactivated by changing its isDeactivated value to "FALSE." A deactivated schema object can be put in a deleted state 176 by a deletion operation, which "tombstones" the schema object.

From an end user's standpoint, a deactivated schema object (attribute or class) behaves very close to one that does not exist. Regular directory search operations do not locate or return the instances of deactivated attribute schema objects. Regular directory search operations do locate and return instances of deactivated class schema objects, but those instances cannot be altered. They can only be deleted or renamed. The deactivated schema object, however, is accessible by searching (viewing) the schema container with LDAP operations and is modifiable. Once an attribute schema object is reactivated, its data instances become visible to LDAP operations. In other words, they can now be read, modified, created, and deleted. Also, once a class schema object is reactivated, its data instances can now be processed with LDAP operations. In other words, they can now be read, modified, created, renamed, and deleted.

There may be multiple deactivated schema objects with the same OID and user-friendly name. For instance, a user may deactivate attribute A and create a new attribute B that contains some changes but is otherwise the same as A. If attribute B does not work, the user can deactivate it and try another new attribute C. Reverting the changes to return to attribute A can be done by simply deactivating attribute C and reactivating attribute A. In the meantime, the data instances associated with attributes A, B, and C are left intact and can be reaccessed by reactivating the associated attribute.

Figure 6:
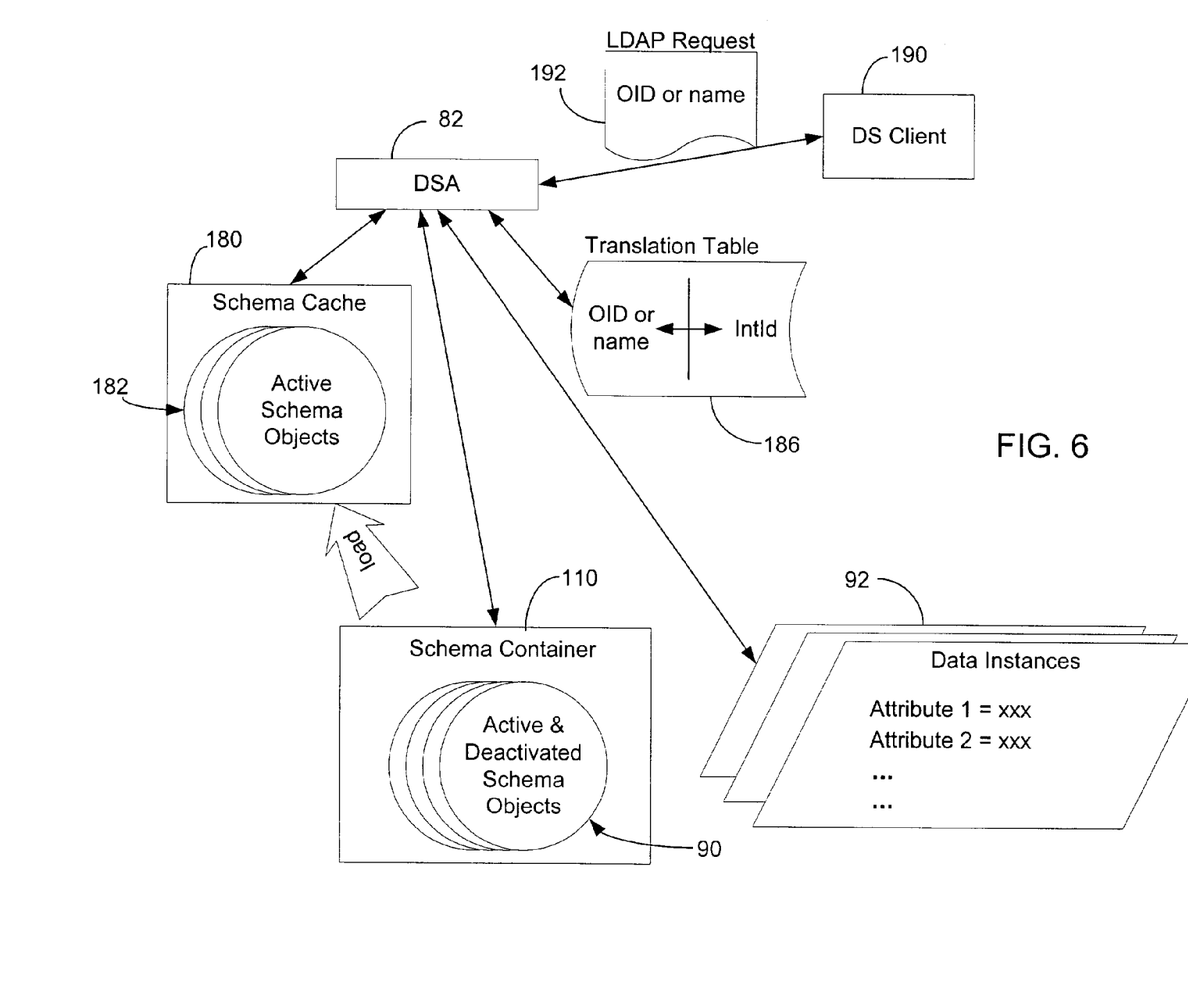
FIG. 6 is a schematic diagram showing a schema cache and a server for accessing the schema cache in response to LDAP requests from clients.

Referring now to FIG. 6, the directory system agent (DSA) 82 of a domain controller maintains a schema cache 180 that contains active schema objects 182. To populate the schema cache, the DSA 82 searches through all the available schema objects in the schema container 110, which contains active schema objects as well as deactivated schema objects. Only those active schema objects, i.e., those with their isDeactivated values set to "FALSE," are loaded into the schema cache 180. The DSA 82 also generates a translation table 186 for translating the OID and user-friendly name of a schema object in the schema cache into the internal ID (IntID) of that schema object.

As mentioned above, a client 190 of the directory service may send a LDAP request for instances of an attribute by sending the DSA 82 a request 192 that contains either the attributeID or ldapDisplayName of that attribute. When the DSA 82 receives the request 192, it coverts the attributeID or ldapDisplayName into the IntID of the corresponding active attribute. The DSA 82 then retrieves the schema object of that attribute in the schema cache 110, and uses it to locate the instances of that attribute schema object, and returns the instances in a response to the requesting client. No instances are returned if no attribute is found or if the indicated attribute in the request is deactivated.

In a preferred embodiment, even if an attribute is deactivated, the deactivated schema object and all of its instances are still replicated to the other directory service nodes so that future activation of that attribute will allow the instances to be accessed immediately.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for performing steps for modifying a schema for a database, comprising:
   setting a deactivation flag attribute of a first schema object to indicate that the first schema object is deactivated, the first schema object having a primary identifier, an internal identifier, and a first attribute; and
   creating a second schema object to supersede the first schema object, the second schema object having a primary identifier that is the same as the primary identifier, an internal identifier that is different from the internal identifier of the first schema object, a deactivation flag attribute that is set to indicate that the second schema object is active, and a second attribute corresponding to the first attribute but defined differently from the first attribute.

2. A computer-readable medium as in claim 1, having further computer-readable instructions for performing the steps of:
   receiving a database access request containing the primary identifier of the first and second schema objects;
   translating the primary identifier to the internal identifier of the second schema object;
   accessing the second schema object based on its internal identifier; and
   retrieving instances of the second schema object from the database.

3. A computer-readable medium as in claim 1, wherein the primary identifier includes an object identifier (OID).

4. A computer-readable medium as in claim 1, wherein the primary identifier includes a user-friendly name.

5. A computer-readable medium as in claim 1, wherein the first and second schema objects contain definitions of an attribute associated with the primary identifier.

6. A computer-readable medium as in claim 1, wherein the first and second schema objects contain definitions of a class of data instances associated with the primary identifier.

7. A computer-readable medium as in claim 1, having further computer-executable instructions for performing the step of deleting the first schema object.

8. A computer-readable medium as in claim 1, having further computer-executable instructions for performing the steps of:
   resetting the deactivation flag of the first schema object to indicate that the first schema object is active;
   resetting the deactivating flag of the second schema object to indicate that the second schema object is deactivated.

9. A computer-readable medium as in claim 1, having further computer-executable instructions for performing the step of replicating the first and second schema objects and instances thereof over a network to remote database servers.

10. A computer-readable medium as in claim 1, wherein the database is a part of a directory service system.

11. A method of modifying a schema for a database, comprising:
    setting a deactivation flag attribute of a first schema object of the schema to indicate that the first schema object is deactivated, the first schema object having a primary identifier, an internal identifier, and a first attribute; and
    creating a second schema object of the schema to supersede the first schema object, the second schema object having a primary identifier that is the same as the primary identifier, an internal identifier that is different from the internal identifier of the first schema object, a deactivation flag attribute that is set to indicate that the second schema object is active, and a second attribute corresponding to the first attribute but defined differently from the first attribute.

12. A method as in claim 11, comprising further steps of:
    receiving a database access request containing the primary identifier of the first and second schema objects;
    translating the primary identifier to the internal identifier of the second schema object;
    accessing the second schema object based on its internal identifier; and
    retrieving instances of the second schema object from the database.

13. A method as in claim 11, wherein the primary identifier includes an object identifier (OID).

14. A method as in claim 11, wherein the primary identifier includes a user-friendly name.

15. A method as in claim 11, wherein the first and second schema objects contain definitions of an attribute associated with the primary identifier.

16. A method as in claim 11, wherein the first and second schema objects contain definitions of a class of data instances associated with the primary identifier.

17. A method as in claim 11, further comprising the step of deleting the first schema object.

18. A method as in claim 11, further comprising the steps of:
   resetting the deactivation flag of the first schema object to indicate that the first schema object is active;
   resetting the deactivating flag of the second schema object to indicate that the second schema object is deactivated.

19. A method as in claim 11, further comprising the step of replicating the first and second schema objects and instances thereof over a network to remote database servers.

20. A method as in claim 11, wherein the database is a part of a directory service system.

21. A computer-readable medium having stored thereon a data structure containing data representing a plurality of schema objects of a schema for a database, said plurality of schema objects including a first schema object and a second schema object each having a primary identifier, an internal identifier, and a deactivation flag attribute, the primary identifier of the first schema object being the same as the primary identifier of the second schema object, the internal identifier of the first schema object being different from the internal identifier of the second schema object, the deactivation flag attribute of the first schema object being set to indicate that the first schema object is deactivated, and the deactivation flag attribute of the second schema object being set to indicate that the second schema object being active.

22. A computer-readable medium as in claim 21, wherein the first and second schema objects contain definitions for a data attribute associated with the primary identifier.

23. A computer-readable medium as in claim 21, wherein the first and second schema objects contain definitions for a class of data instances associated with the primary identifier.

24. A computer-readable medium as in claim 21, where the first schema object includes a first attribute, and second schema object includes a second attribute corresponding to but defined differently than the first attribute.

25. A method of modifying a schema for a database, comprising:
   accessing a first schema object that includes a deactivation flag attribute, a primary identifier, an internal identifier, and a first attribute;
   creating a second schema object to supersede the first schema object, the second schema object including a deactivation flag attribute, the primary identifier, an internal identifier different from the internal identifier of the first schema object, and a second attribute corresponding to the first attribute but defined differently from the first attribute;
   changing the deactivation flag attribute of the first schema object from activated to deactivated, such that when a client requests an instance of a schema object corresponding to the primary identifier, an instance of the first schema object will not be created; and
   setting the deactivation flag attribute of the second schema object to activated, such that when the client requests the instance of the schema object corresponding to the primary identifier, an instance of the second schema object will be crated.

26. The method of claim 25, further comprising:
   changing the deactivation flag attribute of the second schema object from activated to deactivated; and
   changing the deactivation flag attribute of the first schema object from deactivated to activated in order to reactivate the first schema object.

* * * * *

UNITED STATES PATENT AND TRADEMARK OFFICE
CERTIFICATE OF CORRECTION

PATENT NO. : 7,024,434 B2 Page 1 of 1
APPLICATION NO. : 10/286008
DATED : April 4, 2006
INVENTOR(S) : Billy J. Fuller et al.

It is certified that error appears in the above-identified patent and that said Letters Patent is hereby corrected as shown below:

On the Title page, in field (73), under "Assignee", in column 1, line 1, delete "VA" and insert -- WA --, therefor.

In column 2, line 7, delete "superceded" and insert -- superseded --, therefor.

In column 8, line 38, in Claim 9, after "having" delete ",".

In column 10, line 4, in Claim 24, delete "where" and insert -- wherein --, therefor.

In column 10, line 31, in Claim 25, delete "crated." and insert -- created. --, therefor.

Signed and Sealed this

Twenty-third Day of March, 2010

David J. Kappos
*Director of the United States Patent and Trademark Office*